United States Patent
Zanden et al.

(10) Patent No.: US 12,210,173 B2
(45) Date of Patent: Jan. 28, 2025

(54) DEVICE, SYSTEM AND METHOD FOR CHANGING THE DIRECTION OF EMITTED LIGHT CONES

(71) Applicant: SAAB AB, Linkoeping (SE)

(72) Inventors: Johan Zanden, Norrahammar (SE); Anna-Karin Holmer, Joenkoeping (SE); Stefan Andersson, Habo (SE)

(73) Assignee: SAAB AB, Linkoping (SE)

( * ) Notice: Subject to any disclaimer, the term of this patent is extended or adjusted under 35 U.S.C. 154(b) by 574 days.

(21) Appl. No.: 16/795,705

(22) Filed: Feb. 20, 2020

(65) Prior Publication Data
US 2020/0278542 A1    Sep. 3, 2020

(30) Foreign Application Priority Data
Feb. 28, 2019 (SE) .................................... 1950261-6

(51) Int. Cl.
*G02B 5/02* (2006.01)
*G02B 5/04* (2006.01)
(Continued)

(52) U.S. Cl.
CPC ........... *G02B 5/0278* (2013.01); *G02B 5/021* (2013.01); *G02B 5/045* (2013.01); *G02B 5/1842* (2013.01);
(Continued)

(58) Field of Classification Search
CPC ...... G02B 5/0278; G02B 5/021; G02B 5/045; G02B 5/1842; G02B 5/1876; G02B 6/08;
(Continued)

(56) References Cited

U.S. PATENT DOCUMENTS

| | | |
|---|---|---|
| 4,904,049 A | 2/1990 | Hegg |
| 5,274,405 A | 12/1993 | Webster |

(Continued)

FOREIGN PATENT DOCUMENTS

| | | |
|---|---|---|
| EP | 1403696 A1 | 3/2004 |
| EP | 2738582 A2 | 6/2014 |
| EP | 3309600 A1 | 4/2018 |

OTHER PUBLICATIONS

Swedish Patent and Registration Office, Office Action received for Application No. 1950261-6, dated Nov. 10, 2020, 5 pages, Stockholm, Sweden.

(Continued)

*Primary Examiner* — Balram T Parbadia
*Assistant Examiner* — Gabriel A Sanz
(74) *Attorney, Agent, or Firm* — Alston & Bird LLP

(57) ABSTRACT

The present disclosure relates to an image generator device (100) for changing the direction of at least one emitted light cone at a surface (113), comprising an image generator (130) and a fibre optical faceplate (110) having a first (112) and a second surface (113), the fibre optical faceplate (110) being arranged to transmit light from the image generator (130) so at least a part of light entering the first surface (112) of the fibre optical faceplate (110) exits through the second surface (113) of the fibre optical faceplate (110) and pass through an aperture, wherein the fibre optical faceplate (110) comprises a multitude of optical fibres (111) and light exiting the second surface (113) through optical fibres (111) each form an emitted light cone. A surface structure (120) is arranged at the second surface (113) of the fibre optical faceplate (110), wherein the surface structure (120) is arranged to changing the direction of at least part of the emitted light cones exiting the second surface (113) of the fibre optical faceplate (110) towards the aperture.

18 Claims, 4 Drawing Sheets

(51) Int. Cl.
*G02B 5/18* (2006.01)
*G02B 6/08* (2006.01)
*G02B 27/01* (2006.01)
*G02B 3/08* (2006.01)
*G02B 27/00* (2006.01)
*G02F 1/1335* (2006.01)

(52) U.S. Cl.
CPC ............ *G02B 5/1876* (2013.01); *G02B 6/08* (2013.01); *G02B 27/0101* (2013.01); *G02B 27/0172* (2013.01); *G02B 3/08* (2013.01); *G02B 27/0081* (2013.01); *G02B 27/01* (2013.01); *G02B 2027/011* (2013.01); *G02B 2027/0123* (2013.01); *G02B 2027/013* (2013.01); *G02B 2027/014* (2013.01); *G02F 1/133524* (2013.01)

(58) Field of Classification Search
CPC .. G02B 27/0101; G02B 27/0172; G02B 3/08; G02B 27/0081; G02B 27/01; G02B 2027/011; G02B 2027/0123; G02B 2027/013; G02B 2027/014; G02B 5/02; G02F 1/133524; H01J 29/892
See application file for complete search history.

(56) References Cited

U.S. PATENT DOCUMENTS

| | | | |
|---|---|---|---|
| 5,594,561 A | 1/1997 | Blanchard | |
| 6,037,535 A * | 3/2000 | Yoshino | F24S 23/12 |
| | | | 136/246 |
| 6,215,593 B1 * | 4/2001 | Bruce | G02B 6/08 |
| | | | 359/619 |
| 6,488,414 B1 * | 12/2002 | Dawes | G02B 6/02061 |
| | | | 977/827 |
| 8,619,363 B1 * | 12/2013 | Coleman | G02B 5/0242 |
| | | | 359/599 |
| 2007/0237490 A1 | 10/2007 | Reininger | |
| 2012/0120498 A1 * | 5/2012 | Harrison | G02B 3/08 |
| | | | 359/630 |
| 2014/0043320 A1 * | 2/2014 | Tosaya | G02B 27/0172 |
| | | | 345/419 |
| 2015/0207990 A1 * | 7/2015 | Ford | G03B 37/00 |
| | | | 348/262 |
| 2016/0348874 A1 * | 12/2016 | Aruga | F21V 5/045 |
| 2017/0003447 A1 | 1/2017 | Marshall | |
| 2017/0343732 A1 * | 11/2017 | Richards | G02B 6/32 |
| 2018/0284441 A1 * | 10/2018 | Cobb | G02B 5/02 |
| 2019/0025594 A1 | 1/2019 | Holmer et al. | |

OTHER PUBLICATIONS

Swedish Search Report for Application No. 1950261-6, (8 pages), Swedish Patent and Registration Office, Stockholm, Sweden.
Communication Pursuant to Article 94(3) EPC for European Patent Application No. 20159012.2, dated Jun. 4, 2024, (8 pages), European Patent Office, Munichm Germany.
Yuan, et al., "Fabrication of Microlens Array and Its Application: A Review", *Chinese Journal of Mechanical Engineering*, vol. 31:1, 9 pages, Feb. 27, 2018, doi.org/10.1186/s10033-018-0204-y.

* cited by examiner

DEVICE, SYSTEM AND METHOD FOR CHANGING THE DIRECTION OF EMITTED LIGHT CONES

CROSS REFERENCE TO RELATED APPLICATIONS

This application claims priority to Swedish Application No. 1950261-6, filed Feb. 28, 2019; the contents of which are hereby incorporated by reference in their entirety.

TECHNICAL FIELD

The present disclosure relates to a device, system and method to control the direction of emitted light cones exiting a generated image plane at a surface.

BACKGROUND

In an optical imaging or projecting system, such as a head up display (HUD) system, it may be necessary to use a large number of optical elements, such as lenses, to image or project a generated image plane (i.e. object plane) with sufficient accuracy. The large number of elements is required to reduce the optical aberrations of the system.

A typical HUD system comprises an image generator device responsible for creating a generated optical image plane. The image generator device may make up a significant part of the weight and space of the system. The image generator device may be arranged to generate an image plane for the user to observe via an arrangement of optical components, typically a lens and sometimes a combiner. The generated image plane then serves as the object plane for the following optical arrangement. The generated image plane may be located at a surface between two media, such as a glass surface in contact with air. In a typical HUD system at least some light passing through the generated image plane travel towards a combiner via a relay lens. The combiner reflects the light into an eye box, a volume where the user's eye(s) may be able to see the image at the new (virtual) image plane. There is a challenge to design small and/or light weight HUD systems able to provide a sufficiently large and reasonably positioned eye box while at the same time maximizing the number of photons reaching the eye box and minimizing optical aberrations.

BRIEF SUMMARY

An image generating device may comprise a fibre optical faceplate comprising a first surface close to or at a first generated image plane. The fibre optical faceplate transforms the first generated image plane into a second generated image plane at a second surface of the fibre optical faceplate, wherein the second surface may have an arbitrary surface topology. The second generated image plane is then imaged or projected by the following optical system, said optical system may be optimized and simplified by the use of these extra degrees of freedom that are created by allowing the generated image plane to have arbitrary surface topology, e.g. freeform surface shape.

However, shaping the second surface of the fibre optical faceplate arbitrarily may result in the ends of the optical fibres of the fibre optical faceplate being cut such that the emitted light cone from each fibre may be refracted in an unwanted direction, away from a desired aperture, such as an aperture stop, or other limiting (vignetting) aperture or apertures of a following optical system. For the example of a head up display (HUD) system, the cross section of the eye box usually constitutes the aperture stop of the optical projecting system. The refraction of emitted light due to the cut of the optical fibres, and resulting deflection of the emitted light cones, may result in a very inefficient optical system, with large losses due to aperture clipping and/or optical energy ending up outside the aperture stop of the optical system design. An aperture stop is a term used in optical design. The aperture stop location defines the intended direction of optical rays during the optical design work. The aperture stop could be implemented as a physical aperture, or it could be a purely mathematical aperture used in the optical design for optimization of the optical system. For example, in a HUD system, the aperture stop is placed at the centre of the intended eye box.

The present disclosure relates to a method, system and device for controlling the direction and/or shape of at least one emitted light cone exiting a generated image plane with arbitrarily shaped topography. This enables the use of a free form generated image plane, acting as the object plane for the following imaging optical system, in order to simplify the aberration correction of the subsequent imaging or projecting optics, while maintaining sufficient efficiency by changing the direction of the emitted light cone towards the required volume, e.g. an eye box or the aperture of subsequent imaging or projecting optics. The term aperture herein refers to both physical aperture stops and desired regions for light to pass through such as an eye box or the area and/or cone of acceptance of a subsequent optical component. The term eye box herein refers to a region in an optical system wherein the eye of the user preferably is positioned to view an image at a real and/or virtual image plane.

One object of the invention is to increase design freedom of an imaging or projecting optical system utilizing a generated image plane of arbitrary topography.

One object of the invention is to simplify the imaging or projecting optical system by increasing design freedom.

One object of the invention is to decrease the weight and/or size of an imaging or projecting optical system which has the generated image plane as an object plane.

One object of the invention is to decrease the weight and/or size of an image generator device of an optical system.

One object of the invention is to maintain an efficient throughput of an optical system which is imaging or projecting an object plane of arbitrary shape and surface topology.

At least some of the above mentioned objects have in one example been accomplished by means of an image generator device for changing the direction of at least one emitted light cone at a surface. The image generator device comprises an image generator and a fibre optical faceplate having a first and a second surface. The fibre optical faceplate is arranged to transmit light from the image generator so that at least a part of the light entering the first surface of the fibre optical faceplate exits through the second surface of the fibre optical faceplate and pass in a desired direction, such as through an aperture. The fibre optical faceplate comprises a multitude of optical fibres and light exiting the second surface through optical fibres each form an emitted light cone. A surface structure is arranged at the second surface of the fibre optical faceplate. The surface structure is arranged to change the direction of at least part of emitted light cones exiting the second surface of the fibre optical faceplate towards the aperture. The surface structure may be a structure added on top of the second surface and/or a geometry created by engraving or etching into the second surface.

The image generator device is arranged to generate a transformed generated image plane at an arbitrarily shaped surface topology of a second surface of the fibre optical faceplate. The fibre optical faceplate comprises a multitude of optical fibres arranged to transmit light entering the first surface to exit the second surface, whereby light exits the second surface through a fibre as an emitted light cone. The second surface of the fibre optical faceplate may be a non-planar surface. The surface structure arranged at the second surface of the fibre optical faceplate is arranged to change the direction of at least one emitted light cone (path of photons) exiting the fibre optical faceplate towards the aperture of the following optical system, such as a HUD system. The extent of this overlaying surface structure, to the arbitrarily shaped second surface, is preferably less than the focal distance of the following imaging or projecting system, or within the tolerances of the position of the generated image plane, the tolerances being determined by the required performance of the application. For a HUD system these tolerances may be in the order of 25 µm.

The surface structure thickness may be in the range of 10 nm-1000 µm.

The surface structure thickness may be in the range the range of 1-100 µm.

The surface structure may be arranged to change the surface normal of the arbitrarily shaped fibre optical faceplate surface, utilizing refraction to change the direction of at least part of at least one emitted light cone. The surface structure may change the shape and/or direction of at least one emitted light cone.

The surface structure may be deposited on the fibre optical faceplate surface by means of photolithography. The surface structure may be moulded on top of the fibre optical faceplate surface, machined into a material deposited on top of the fibre optical faceplate surface, e.g. by diamond turning, or 3D-printed on top of the fibre optical faceplate surface.

The surface structure may comprise at least two materials with different refractive index. The surface structure may comprise at least two materials with different refractive index wherein the boundary between the two materials is of a non-planar topography. The use of materials with different refractive index with a non-planar boundary between materials may allow the outer surface of the surface structure to be smooth. Depending on the material of the fibre optical faceplate, the surface structure may be machined directly into the fibre optical faceplate, e.g. using diamond turning.

Light travelling from the image generator through the fibre optical faceplate forms a transformed generated image plane at the second fibre optical faceplate surface with an arbitrary surface topography. The arbitrary topography of the second fibre optical faceplate surface and resulting transformed generated image plane (or object plane as seen from the following optical system) may be optimized to limit the optical aberrations of the optical system and thus reduce the need for aberration correction of the optical system, allowing said optical system to be simplified. A generated image plane of arbitrary topography may reduce complexity, weight and cost of the imaging or projecting optical system. The surface structures on the second fibre optical faceplate surface assures that the emitted optical energy is transmitted through the imaging or projecting optical system with high efficiency towards the aperture of the following optical system, such as the eye box of a HUD.

The image generator may comprise a liquid crystal display (LCD) or a light-emitting diode (LED) display or a cathode-ray tube (CRT) display or a digital micromirror device (DMD). The image generator may comprise relay optics.

Ideally, the emitted light cones exiting the generated image plane at the second surface of the fibre optical faceplate are directed to overlap at the aperture of the following optical system, e.g. via at least one relay optics component and/or combiner to a cross section of the eye box of a HUD.

In some embodiments of the invention, a diffuser is integrated into the image generator and/or arranged between the image generator and the first surface of the fibre optical faceplate. Either side of the fibre optical faceplate may comprise a diffuser. A diffuser may also or instead be arranged at the second surface of the fibre optical faceplate, which may already have a surface structure to redirect the emitted light cones. The diffuser may then comprise of a substructure, with features considerably smaller than the cross section of the optical fibres of the fibre optical faceplate. The substructure may be integrated on top of the redirecting surface structure.

Thus, the surface structure may comprise a substructure. The surface structure may comprise a diffuser. As is also clear from the above, the image generator device may comprise a first diffusor comprised in the surface structure and/or a second diffusor integrated into the image generator and/or arranged between the image generator and the first surface of the fibre optical faceplate.

The function of the diffuser, if arranged on the second fibre optical faceplate surface, is to increase the solid angle of the emitted light cone from the fibres of the fibre optical faceplate to be larger than the numerical aperture of the optical fibres. It is not necessary to increase the emitted light cone angle rotation symmetrically. The emitted light cone may have an elliptical cross section by having different size of the diffusing structure, e.g. an elliptically shaped diffracting structure or a stripe like shape. The diffusing structure may change locally across the surface both regarding size and/or orientation. Increasing the cross section of the emitted light cone may increase the size of the eye box of an optical system, assuming any vignetting apertures in relay optics and combiner are adjusted accordingly. In other systems it might assure that the aperture is filled, or over-filled with sufficient homogeneity, of the transmitted light across the aperture.

If the diffusing structure is arranged on and/or between the image generator and first fibre optical faceplate surface, the main intention would be to fill the numerical aperture (NA) of the optical fibre of the fibre optical faceplate. Under filling the fibre NA may result in an emitted light cone with no, or reduced intensity at the centre of the light cone, i.e. an annular light cone. This is usually not desired. A filled numerical aperture also improves the homogeneity across the aperture of the optical system, but the size of the emitted light cone is limited by the NA of the optical fibres. The NA of the fibres may be chosen so as to constitute a limiting aperture, if appropriate in order to reduce aberrations due to the following optical system.

As discussed above, the surface structure is arranged at the second surface of the fibre optical faceplate. The surface structure may allow light exiting the fibre optical faceplate surface to be refracted and/or diffracted towards the aperture of the optical system in such a way that the aperture is sufficiently filled, and reduce the amount of light that is vignetted in other apertures of the optical system, compared to a fibre optical faceplate without surface structures. For example this may allow for an optical system comprising an eye box with higher and more homogenous luminance than if the optical system did only have the fibre optical faceplate without comprising a surface structure. A surface structure may cause light exiting the second fibre optical faceplate surface to diffuse in such a way that the aperture is overfilled or the aperture may be increased. For example, an eye box may increase in size compared to a fibre optical faceplate without surface structures and diffusing subsurface structure.

The surface structure may comprise different geometries in different regions of the fibre optical faceplate surface. A first surface structure may be applied to a first region of the second surface of the fibre optical faceplate and a second surface structure may be applied to a second region of the second surface of the fibre optical faceplate.

The surface structure may be structured like a Fresnel lens, forming a circular symmetric pattern of concentric ring structures.

The surface structure is not limited to circular symmetrical structures. The surface structure may be free form, or have elliptical structures. The surface structure may comprises a non-circular symmetric Fresnel lens, forming a pattern of concentric elliptical structures.

The purpose of the surface structure may be to direct the emitted light cones towards a desired direction, without significantly degrade the quality of the resulting real or virtual image of the following system. The surface structure geometry dimension in the direction normal to the unstructured surface shape of the surface structure features is preferably less than the focal depth of the following imaging or projecting optical system. If the surface structure significantly offsets the second generated image plane (without surface structure), the generated image plane including the surface structure, may go out of focus of the following optical system. Significantly offsetting the second generated image plane may also be expressed as the surface structure feature depth exceeding the position tolerances at any point across the surface as determined by the subsequent imaging and/or projecting optical system and its application. The surface structure may comprise a structure arranged to function as a diffuser. The dimensions of the structure are chosen so as to get the desired diffusion pattern (shape and size of emitted light cone cross section) depending on the optical wavelength/s of the application.

There is a challenge to decrease size and weight of an imaging or projecting optical system, such as a HUD system, while maintaining the throughput of the optical system. By changing the surface shape (topology) of the surface to be imaged, this gives more degrees of freedom to control optical aberrations, and the number of elements may be reduced or the imaging system may otherwise be simplified. However, when using a fibre optical faceplate to acquire a freeform plane to be imaged, the emitted light may be directed away from the aperture(s) of the following optical system. By changing the direction of the emitted light towards the aperture of the subsequent optical system and minimize aperture clipping (vignetting) by the optical system, the optical throughput may be kept at a sufficiently high level. In a HUD system, a cross section of the eye box at the eye reference point is to be regarded as the aperture of the optical system, even though there is no physical aperture stop at this position. Therefore, directing emitted light cones towards the aperture may ensure that the eye box is filled. By increasing the size of the light cone emitted from the fibre optical faceplate, the size (cross section) of the eye box might also be increased, assuming the optical system has sufficiently large lens aperture. If the emitted light cones are not directed towards the aperture(s) and eye box, the light may end up outside the intended eye box, regardless of the size of the lenses in the projecting optical system. The present invention may result in a simplification of the optical system by using the extra degrees of freedom gained by allowing the plane of the generated image to have arbitrary surface shape and from that surface directing the emitted light exiting through the generated image plane towards the aperture of the subsequent optical system.

The present disclosure further relates to an optical system comprising a combiner and an image generator device comprising a fibre optical faceplate and an image generator. The optical system may be a head up display system. The image generator is arranged to generate an image plane at a first fibre optical faceplate surface. The photons entering the first surface are transmitted through the fibre optical faceplate and exit the second surface of the fibre optical faceplate, whereby a transformed generated image plane is formed at the second surface. The fibre optical faceplate comprises a multitude of optical fibres each arranged to form an emitted light cone at the second surface of at least part of the light entering the first surface. The fibre optical faceplate comprises a surface structure arranged to change the direction of at least one emitted light cone at the second fibre optical faceplate surface towards an eye box via the combiner.

The image generator may comprise a liquid crystal display (LCD) or a light-emitting diode (LED) display or a cathode-ray tube (CRT) display or a digital micromirror device (DMD). The image generator may comprise relay optics.

The image generator is arranged to generate a first image plane. The surface structure may be arranged to change the surface normal of the second surface of the fibre optical faceplate, utilizing refraction and/or diffraction to change the direction of at least one emitted light cone. The second surface of the fibre optical faceplate may have an arbitrary surface topography, such as curved. The system may comprise at least one optical component arranged between the image generator device and/or combiner and/or eye box, such as a beam splitter to reflect photons from the image generator device to the combiner.

The system may comprise at least one optical component arranged to direct light between the image generator device and/or the beam splitter and/or the combiner and/or the eye box.

The system may comprise a beam splitter arranged to reflect light from the second surface of the fibre optical faceplate towards the combiner, and transmit the reflected light from the combiner to the eye box.

A very simple HUD optical system may be obtained with a concave generated image plane. If the image plane is placed in front of a concave combiner, at a distance half the radius of curvature of the combiner and with the generated image plane having half the radius of curvature as the combiner, no further optical elements with optical power may be required. A beam splitter may be required for the image generator not to block the eye box. Such an arrangement is often referred to as an On-axis HUD. The problem may then be to generate a spherical, convex image plane. This may be done by imaging some kind of flat display, using relay optics, to have the correct size and shape as the required generated image plane for the applicable on-axis HUD system. However, this may be quite bulky and require considerable space. By just putting a fibre optical faceplate on top of a flat display, the first surface of the fibre optical faceplate being flat and the second surface being convex spherical, the desired shape of the generated image plane may be obtained. However, none or little of the light emitting the curved fibre optical faceplate surface may be transmitted in the direction of the combiner and eye box. Even if the combiner was made very large, this may not direct more light towards the eye box. For the intended function, light has to be emitted from the spherical generated image plane in the correct direction. If no or very little light is going in the correct direction, i.e. most of the light cone misses the desired target, the light cone may be increased by a diffuser. With a larger light cone, more light may be available in the correct direction. However, most part of the light may still be going in the wrong, nonusable, direction making the system highly inefficient. If instead, the light cones emitted from the curved second surface of the fibre optical faceplate, could be redirected into the correct light path, the system efficiency may be much improved (compared to just using a diffuser). This redirection of emitted light cones may be obtained by applying a surface structure on the second surface of the fibre optical faceplate, as described by the present disclosure.

For more complicated HUD systems, e.g. an off-axis HUD including a relay lens between the generated image plane and the combiner (but without beam splitter), the concept is the same. The relay lens may typically comprise six to seven large lenses to correct for the optical aberrations due to the fact that the combiner is tilted vs the optical axis. The extra degrees of freedom created by allowing by the generated image plane on the second side of the fibre optical faceplate to be of arbitrary shape (spherical or elliptical convex/concave or completely freeform) may be used to correct for some of the optical aberrations in the HUD system, thus reducing the required number of lens elements of the relay optics. A surface structure on the second fibre optical faceplate surface may ensures that the emitted light travels in the desired direction.

As discussed above, the surface structure is arranged at the second surface of the fibre optical faceplate. The surface structure may change the direction of at least one emitted light cone exiting the fibre optical faceplate second surface towards the combiner in such a way that more of the photons enters the eye box compared to a fibre optical faceplate without surface structures. The surface structure may cause photons exiting the fibre optical faceplate second surface to be diffused in such a way that a user's eye may see the image from more desired positions (larger eye box) compared to a fibre optical faceplate without surface structures.

The present disclosure further relates to a method for changing the direction of at least one emitted light cone comprising a step of transmitting light from an image generator to a first surface of a fibre optical faceplate, whereby a generated image plane is formed at the first surface of the fibre optical faceplate. The method further comprises a step transmitting at least part of the light entering the first surface of the fibre optical faceplate to a second surface of the fibre optical faceplate, whereby for each at least one fibre of the optical faceplate an emitted light cone of photons exiting the second surface is formed. The method comprises a step of generating a transformed generated image plane at the second surface of the fibre optical faceplate. The method comprises a step of changing the direction of the at least one emitted light cone of photons exiting the fibre optical faceplate through the second surface towards an aperture or a desired direction by means of a surface structure arranged at the second surface of the fibre optical faceplate.

DETAILED DESCRIPTION OF VARIOUS EMBODIMENTS

Figure 1:
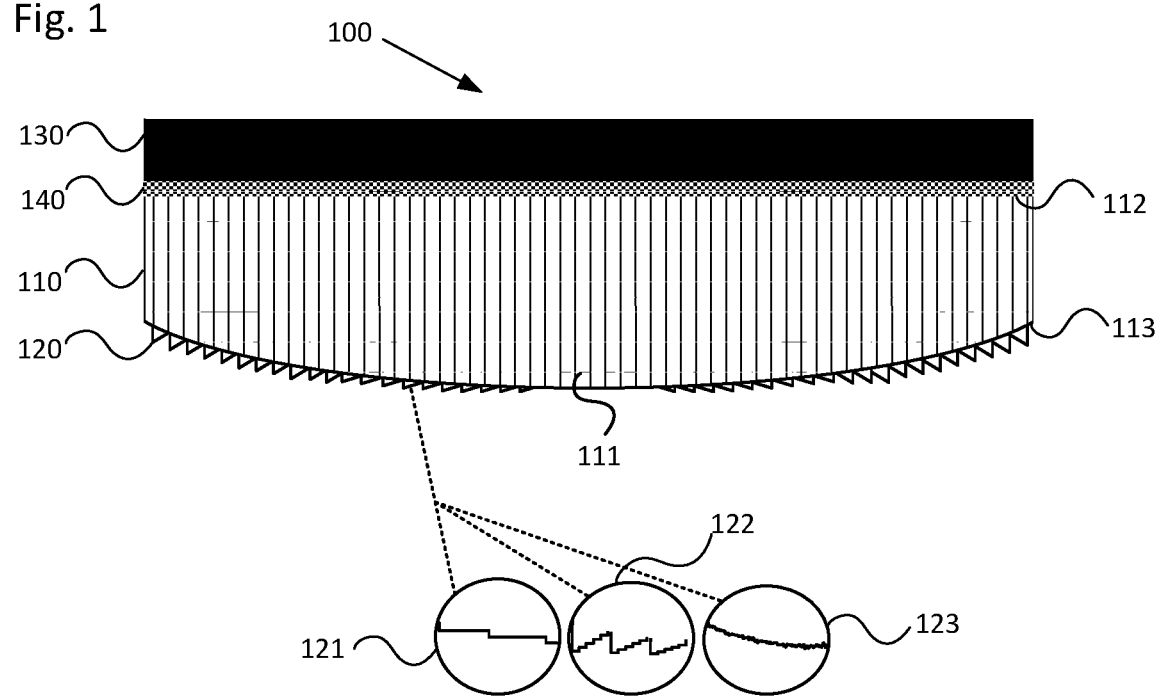
FIG. 1 shows schematically an image generator device comprising a surface structure.

Throughout the figures, same reference numerals refer to same parts, concepts, and/or elements. Consequently, what will be said regarding a reference numeral in one figure applies equally well to the same reference numeral in other figures unless not explicitly stated otherwise.

FIG. 1 shows schematically an image generator device 100 comprising a surface structure 120. The example image generator device 100 comprises a fibre optical faceplate 110, a surface structure 120 and an image generator 130. The fibre optical faceplate 110 comprises a planar first surface 112 and a convex second surface 113. The first surface 112 of the fibre optical faceplate 110 has within given tolerances the same shape or surface topography as the first image plane of the image generator 130. The shape or topography of the image plane of the image generator 130 may be any shape, but most common as depicted in FIG. 1 is the example of a planar image generator generating a planar image plane. The first surface 112 of the fibre optical faceplate 110 substantially follows the shape or surface topography of the first image plane in order to efficiently couple the light emitted from the image generator 130 into the faceplate 110. The second surface 113 may be of an arbitrary topography. The second surface 113 serves as object plane for the following optical system. The image generator device 100 may comprise a diffuser 140 arranged between the image generator 130 and the first surface 112 of the fibre optical faceplate 110. The image generator 130 is arranged to send light into the first surface 112 of the fibre optical faceplate 110. The diffuser 140 may be part of the image generator 130 and/or the surface structure 120. The fibre optical faceplate 110 comprises a multitude of optical fibres 111 arranged to transmit light entering the first surface 112 of the fibre optical faceplate 110 to exit the second surface 113 of the fibre optical faceplate 110. Light exits the second surface 113 of the fibre optical faceplate 110 via at least one fibre 111 in an emitted light cone. A generated image plane formed at the first surface 112 of the fibre optical faceplate 110 results in a transformed generated image plane at the second surface 113 of the fibre optical faceplate 110.

The surface structure 120 is arranged at the second surface 113 of the fibre optical faceplate 110. The surface structure 120 may be created on the second surface 113 by means of lithography. Depending on the material of the fibre optical faceplate 110, the surface structure 120 may also be machined into second surface 113 of the fibre optical faceplate 110. The surface structure 120 may also be machined into a material deposited on the second surface 113, moulded onto the second surface 113 and/or 3D-printed on the second surface 113, or may be created by any other technology to generate a surface structure.

The surface structure 120 is arranged to change the direction of at least one emitted light cone of light exiting the second surface 113 of the fibre optical faceplate 110. The surface structure 120 may change the direction of the at least one emitted light cone by changing the surface normal of the second surface 113 of the fibre optical faceplate 110. A side view of three schematic examples of surface structures 120 are shown in FIG. 1, a stair structure 121 altering the surface normal to stay substantially constant across a curved surface, a structure 122 comprising a substructure of smaller dimension and a light scattering structure 123. The surface structure 120 may comprise at least one structure arranged to change the direction of at least one emitted light cone, such as the step structure 121 altering the surface normal. The surface structure 120 may comprise a diffuser arranged to increase the cone angle of at least one emitted light cone, such as the light scattering structure 123. The surface structure 120 may also comprise a combination of a more shallow diffusing and/or diffracting structure on top of a comparatively deeper structure and with larger transversal features (extent across the surface) thus implementing both changing direction of emitted light cone and broadening the emitted light cone.

The surface structure 120 may change the direction of the emitted light cones by comprising a layer with a refractive index different to the refractive index of the second surface 113 of the fibre optical faceplate 110. The surface structure 120 may also change the direction of the emitted light cones by comprising several layers with different refractive indexes, e.g. by graded index 3D printing. The microstructure 120 may comprise an embedded surface structure of materials of different indexes, wherein the resulting outer surface may be smooth. The surface structure 120 in FIG. 1 illustrates a structure changing geometry from the centre region of the convex second surface 113 of the fibre optical faceplate 110 to the regions furthest from the centre. The surface structure 120 may have the same geometry across the second surface 113 of the fibre optical faceplate 110.

The schematic drawing of the surface structure 120 in FIG. 1 aims to show a possible location for the surface structure 120 on the second surface 113 of the fibre optical faceplate 110 and show schematically how the surface structure 120 geometry may be different over the second surface 113. The illustrated surface structure 120 geometry is not to scale and/or may not be geometrically representative of a functional surface structure 120. The possible surface structures 120 are in no way limited to the surface structures shown in the figures.

Figure 2:
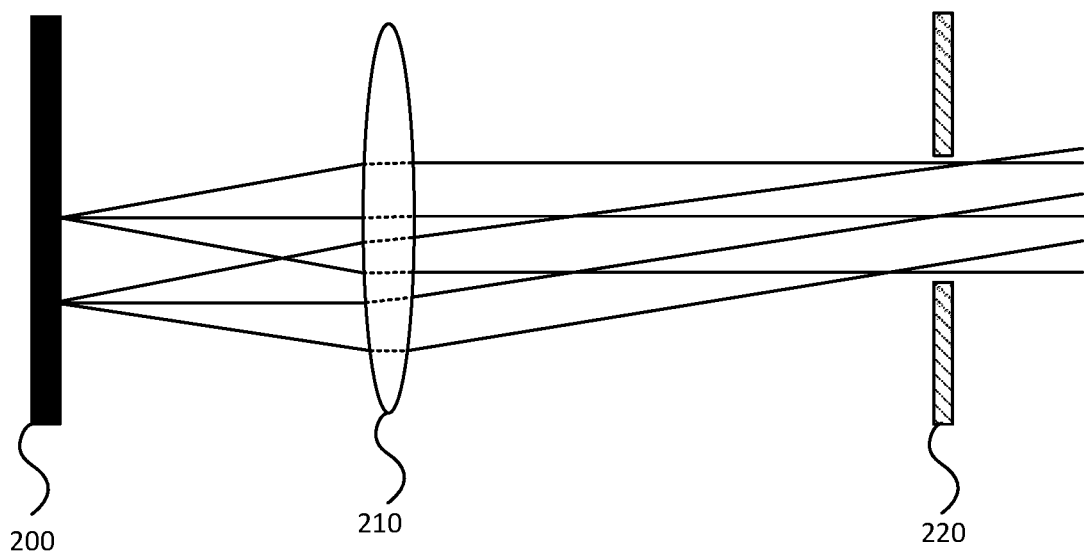
FIG. 2 shows schematically an optical projecting system comprising a planar display device.
Figure 3:
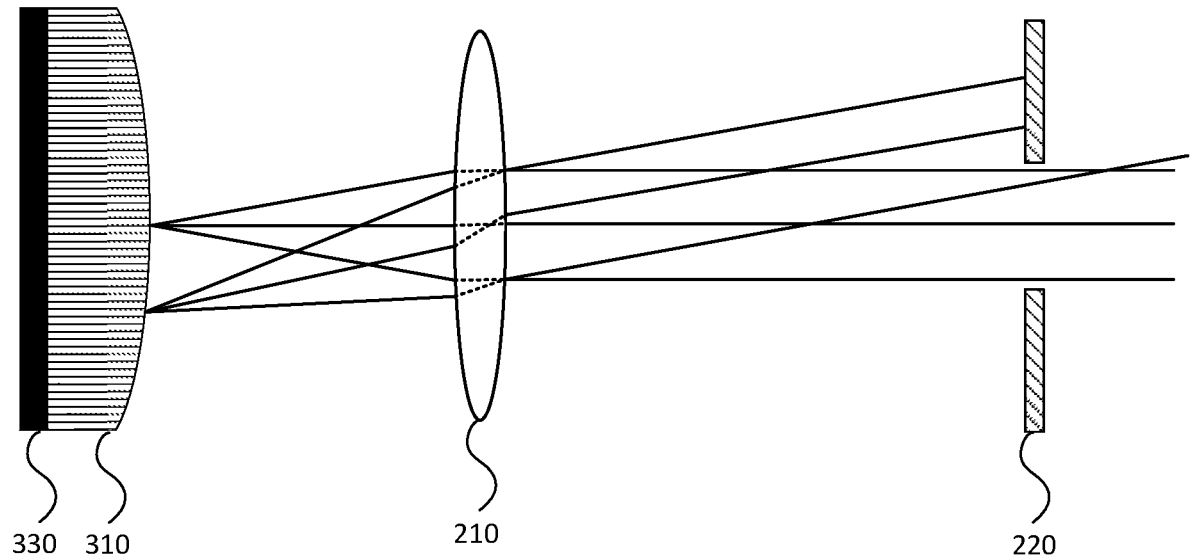
FIG. 3 shows schematically an optical projecting system comprising an image generator device with a convex surface but without a surface structure.
Figure 4:
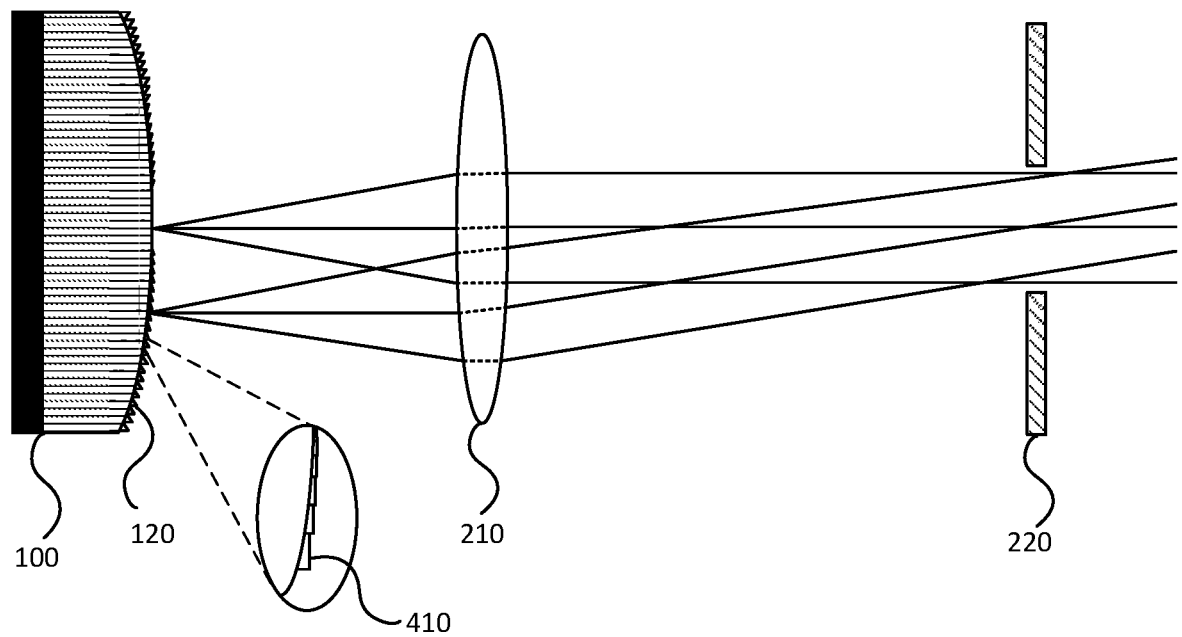
FIG. 4 shows schematically an optical projecting system comprising an image generator device with a convex surface comprising a surface structure.

The convex second surface 113 of the fibre optical faceplate 110 forms a transformed generated image plane. A transformed generated image plane at a surface with non-planar topography may be desired in an optical system to more accurately and more easily image or project an image plane, such as a HUD system comprising a concave combiner. FIGS. 2 and 3 illustrate the result of merely changing the surface topography from a planar image generating element (e.g. a conventional planar display element) in FIG. 2, into a convex generated image plane with a planar first surface and a convex second surface fibre optical faceplate in FIG. 3. Due to the limited NA of the optical fibres, and the fibres second surface being cut at an oblique angle, the emitted light cones may be directed away from the aperture of the following optical system in FIG. 3. FIG. 4 illustrates how the problem of light exiting a non-planar second surface 113 in undesirable directions may be solved by adding a surface structure 120 to the non-planar second surface 113 of a fibre optical faceplate 110.

FIG. 2 shows schematically an optical projecting system comprising a planar display device 200. The system comprises a planar display device 200, a lens 210 and an aperture stop 220. The planar display device is arranged to generate an image at a generated image plane. In FIG. 2 light emitted from two points on the generated image plane and entering the aperture stop 220 via an optical lens 210 are illustrated. The aperture, illustrated in FIG. 2, acts as a physical aperture stop 220 that photons either pass through or are stopped by. An aperture may also be an eye box or an acceptance cone and/or acceptance area of a subsequent optical system. The emitted light from the planar display device 200 may not be limited to the light that passes the aperture stop.

An observer's eye placed at the opening of the aperture stop 220 may see an image located at or close to infinity, wherein image distance depends on the collimation of the light transmitted through the aperture stop 220. The aperture stop 220 may be replaced by an eye box located at the aperture stop 220 opening. A planar image plane at the planar display device 200 viewed via a concave combiner, a common component in head up display systems, may result in an aberrated image. A transformed generated image plane formed along a convex second surface viewed via a concave combiner may result in a less aberrated image.

FIG. 3 shows schematically an optical projecting system comprising an image generator device with a convex surface but without a surface structure 120. The system comprises an image generator device, a lens 210 and an aperture stop 220. The image generator device comprises a planar image generator 330 and a plano-convex fibre optical faceplate 310. The plano-convex fibre optical faceplate 310 in FIG. 3 does not comprise a surface structure 120. The plano-convex fibre optical faceplate 310 comprises fibres 111 each arranged to send photons from the planar image generator 330 entering a first surface 112 of a fibre optical faceplate 120 and exiting a convex second surface 113 of the plano-convex fibre optical faceplate 310 in an emitted light cone. A generated image plane at the first surface 112 of the plano-convex fibre optical faceplate 310 may generate a transformed generated image plane at the second surface 113 of the fibre optical faceplate 310.

In FIG. 3 the light paths of emitted light cones from two fibres 111 are illustrated. Light exiting the central region of the convex second surface 113 of the fibre optical faceplate 310 passes through a lens 210 and an aperture stop 220. Light exiting the convex second surface 113 of the fibre optical faceplate 310 further from the centre, a surface region with a different surface normal, is refracted away from the light path that would hit the centre of the aperture stop. The size of the illustrated light cone is for illustration purposes. There may exist light outside the illustrated cone, but the largest intensity of light is usually at the centre of the emitted cone, so therefore we want to hit the centre of the aperture stop with the centre of the emitted light cone to get a high efficiency system. It may also be that the light cone is indeed limited and that no, or very little energy is directed towards the aperture stop of the system. This may be solved by implementing a diffuser to increase the emitted light cone. However, this may spread the available light across a larger area and although some light actually passes the aperture stop, the system efficiency may be low.

A virtual image at or close to infinity of the image formed at the transformed generated image plane at the convex second surface 113 may be viewed through the aperture stop 220 just as for the system in FIG. 2. However, it may appear as an image with significantly lower light intensity outside of the centre of the image (vignetting) and/or with no light at all from the outer edges of the image (restricted field of view). The shape (topography) of the transformed generated image plane formed at the non-planar second surface 113 may be desirable to avoid at least some optical aberrations, however, the change in direction of emitted cones may cause mismatch between the emission angles of the optical fibres and entrance aperture for the subsequent optical systems.

FIG. 4 shows schematically an optical projecting system comprising an image generator device 100 with a convex surface 113 comprising a surface structure 120. The system comprises an image generator device 100, a lens 210 and an aperture stop 220. The image generator device 100 may be the same image generator device 100 presented in FIG. 1. The image generator device 100 comprises a plano-convex fibre optical faceplate 110 and a planar image generator 130. The fibre optical faceplate 110 comprises fibres 111 each arranged to send photons from the image generator 130 entering a first surface 112 of the fibre optical faceplate 110 and exiting the convex second surface 113 of the fibre optical faceplate 110 in an emitted light cone. The surface structure 120 is arranged at the second surface 113 of the fibre optical faceplate 110. The image generator device 100 comprises a surface structure 120 at the convex second surface 113 arranged to change the direction of at least one emitted light cone through the aperture stop 220 via the lens 210.

In FIG. 4 the light paths of emitted light cones from two fibres 111 are illustrated. Light exiting the convex second surface 113 of the fibre optical faceplate 110 passes through a lens 210 and through an aperture stop 220. Light exiting the convex second surface 113 of the fibre optical faceplate 110 is redirected by the surface structure 120 to reach the lens 210 in emitted light cone angles similar to the emitted light cone angles of the planar display device 200 seen in FIG. 2, or in an as efficient way as possible. The second surface 113 of the fibre optical faceplate 110 may be a surface of arbitrary topography.

An image generator device 100 comprising a non-planar second surface 113 of a fibre optical faceplate 110 and a surface structure 120 arranged to change the direction of emitted light cones towards an aperture may significantly increase the number of photons passing through an aperture stop or an eye box. By utilizing a thin surface structure 120 arranged at the second surface 113 the light may be redirected at a point close to the image plane at the second surface 113. The surface structure 120 may be arranged to change the direction of emitted light cones of fibres 111 on a second surface 113 of arbitrary topography. The surface structure 120 may be arranged to change the shape of at least one emitted light cone to completely fill the aperture stop 220 or eye box.

The image generator device 100 comprising a surface structure 120 may reduce the number and/or complexity of optical components required in an optical system, such as a HUD system. The surface structure 120 in FIG. 4 illustrates a surface structure 120 changing geometry from the centre region of the convex second surface 113 of the fibre optical faceplate 110 to the regions furthest from the centre. The second surface 113 of the fibre optical faceplate 110 in FIG. 4 is convex, however, the present disclosure is not limited to convex surfaces 113 and the second surface 113 may be used for an arbitrary surface topology. The first surface 112 of the fibre optical faceplate 110 may be a surface of arbitrary surface topography. However, efficiently coupling the light from the image generator 130 to the fibre optical faceplate 110 may require the shape or surface topography of the first surface 112 of the fibre optical faceplate 110 to resemble the shape of the generated image plane of the image generator 130, in order to be positioned close together.

The paths of light from the two emitted light cones illustrated in FIG. 4 may be seen as each exiting through a surface structure 120 surface plane locally parallel to the plane of the first surface 112, as shown in an example surface structure 410, whereby emitted light cones may be refracted similarly to the emitted light cones in FIG. 2. The schematically drawn surface structure 120 in FIG. 4 is not to scale and/or may not be geometrically representative of a functional surface structure 120.

The present disclosure relates to optical systems comprising an image generator device generating an image plane at a surface with an arbitrary topology, such as a head up display system.

Figure 5:
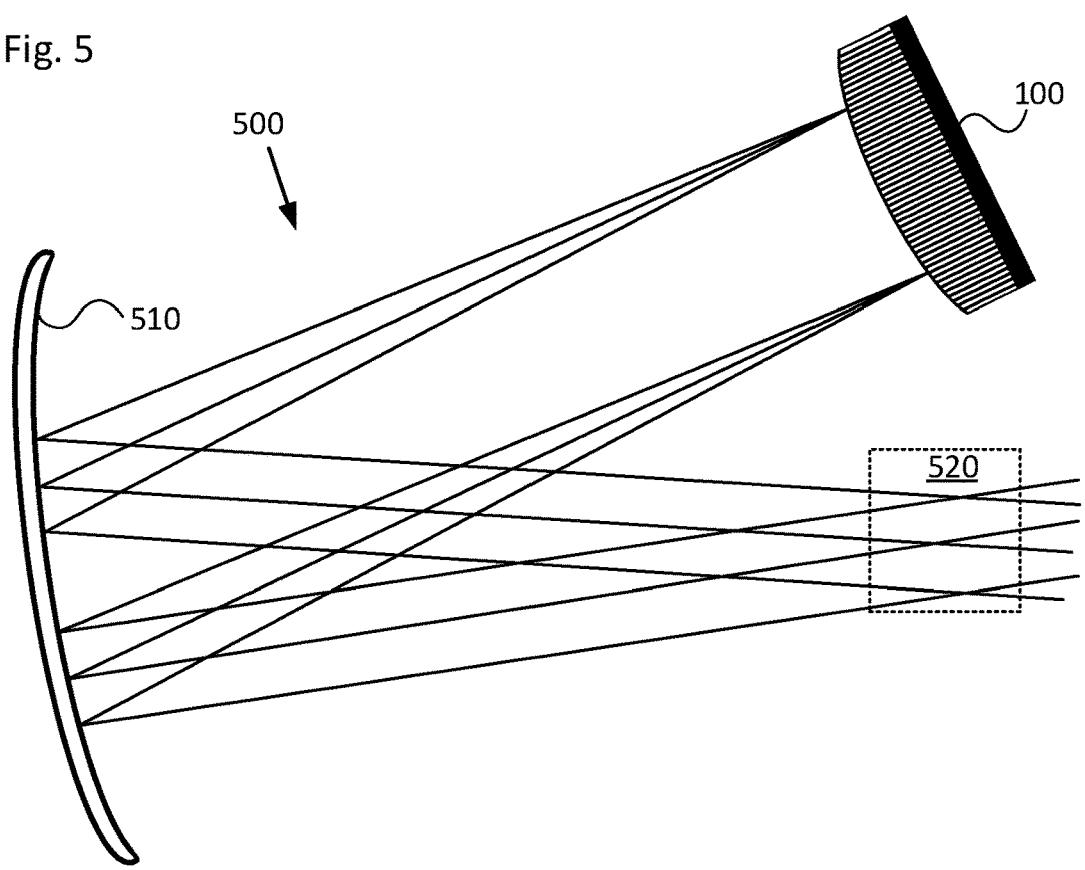
FIG. 5 shows schematically an optical system.

FIG. 5 shows schematically an example of an application of the image generator device 100 as discussed herein in an optical system 500. The system 500 comprises an image generator device 100 comprising a surface structure 120 (not shown) and a combiner 510. The image generator device 100 may be the same as the image generator device in FIG. 1. The optical system 500 may be a head up display system. The system defines an eye box 520, a region wherein the eye of the user may preferably be positioned to, via at least one optical component, view an image (real or virtual) of the generated image plane at a convex second surface 113 of a plano-convex fibre optical faceplate 110. The surface structure 120 is arranged at the convex second surface 113 of the fibre optical faceplate 110 comprised in the image generator device 100. The surface structure 120 is arranged to change the direction of at least one emitted light cone of light exiting the convex second surface 113 of the fibre optical faceplate 110 towards the eye box 520 via the combiner 510. The combiner 510 is arranged to reflect light from the convex second surface 113 of the fibre optical faceplate 110 into the eye box 520. The combiner 510 is arranged to allow light to pass through the combiner 510 and into the eye box 520. Light from an environment passing through the combiner 510 and light from the image generation device 100 reflected in the combiner 510 may be viewed simultaneously at the eye box.

To change the direction of emitted light cones exiting a convex surface towards an eye box 520 via a combiner 510 by means of a surface structure 120 at the second surface 113 in the system 500 is comparable to the change in direction of emitted light cones towards the stop aperture 220 described in FIG. 4. The second surface 113 of the fibre optical faceplate 110 may be a surface of an arbitrary topology. The first surface 112 of the fibre optical faceplate 110 may be a surface of an arbitrary topology. The optical system 500 may comprise at least one relay optics component arranged to direct light from the second surface 113 of the image generator device 100 to the combiner 510 and/or from the combiner 510 to the eye box 520.

A desirable position for a convex image plane in relation to a concave combiner 510 may be directly in front of and facing the combiner 510. As previously described such a solution is problematic as the image generator device 100 would, under normal circumstances, block the view of the centre of the combiner 510 as the centre of the combiner, the image generator device and eye box would be on a line. In the optical system 500 in FIG. 5 the image generator device 100 is placed off axis to create the simplest possible system. However, even with a surface structure 120 arranged to change the direction of emitted light cones the vignetting and light intensity at the eye box 520 may be unacceptable for certain applications without additional optical components. An alternative is to add a beam splitter in order to increase the freedom of positioning the image generator device 100 and allows the image plane to be "placed" directly in front of the combiner 510 without blocking line of sight between combiner 510 and eye box 520.

Figure 6:
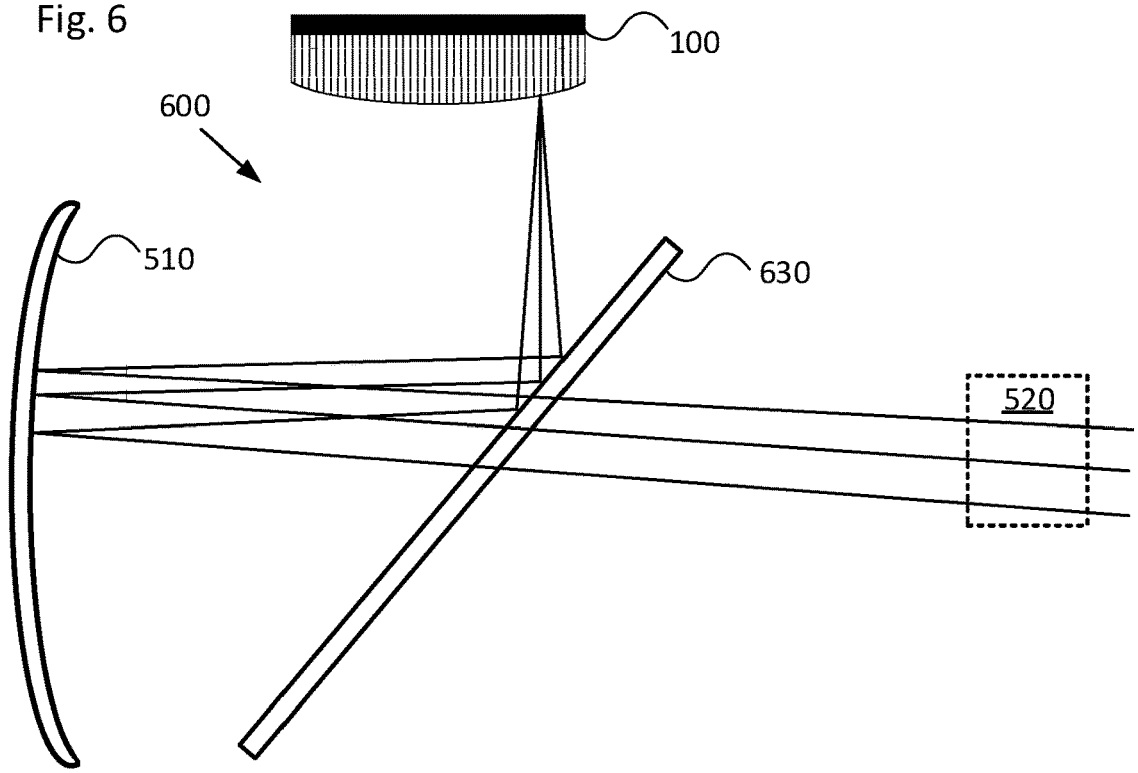
FIG. 6 shows schematically an on-axis optical system comprising a beam splitter.

FIG. 6 shows schematically an example of an on-axis optical system 600 comprising a beam splitter 630. The system 600 comprises an image generator device 100 comprising a surface structure 120 (not shown), a combiner 510 and a beam splitter 630. The image generator device 100 may be the same image generator device 100 as described in FIG. 1. The optical system 600 may be a head up display system. The surface structure 120 is arranged at the second surface 113 of the fibre optical faceplate 110 comprised in the image generator device 100. The surface structure 120 is arranged to for at least one fibre 111 of the fibre optical faceplate 110 change the direction of an emitted light cone towards an eye box 520 via the combiner 510. The beam splitter 630 is arranged to reflect light from the image generator device 100 towards the combiner 510. The beam splitter 630 is arranged to allow light travelling from the combiner 510 towards the eye box 520 to pass through the beam splitter 630.

The system 600 comprising a beam splitter 630 may allow the image generator device 100 to be positioned more freely compared to a system without a beam splitter 630. The optical system 600 may comprise at least one relay optics component arranged to direct light from the image generator device 100 to the beam splitter 630 and/or from the beam splitter 630 to the eye box 520.

Figure 7:
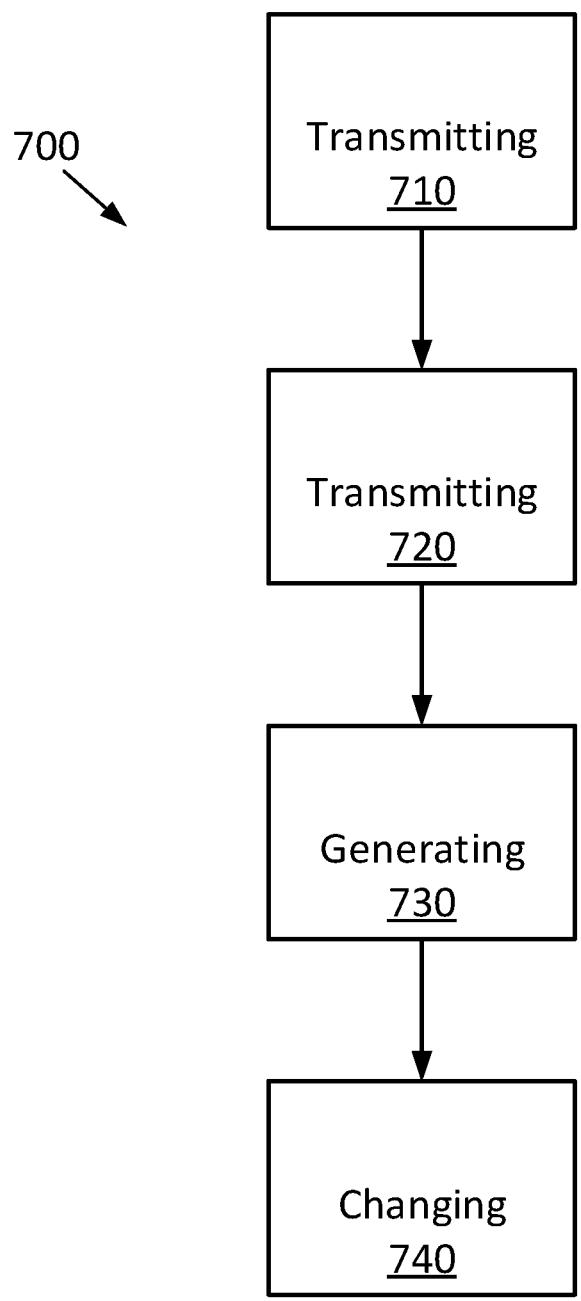
FIG. 7 shows a method for changing the direction of at least one emitted light cone.

FIG. 7 shows schematically method 700 for changing the direction of at least one emitted light cone comprising a steps of transmitting 710 light to a first surface 112 of an fibre optical faceplate 110, whereby forming a generated image plane at the first surface 112. The method 700 comprises further a step of transmitting 720 at least part of the light entering the first surface 112 to a second surface 113 of the fibre optical faceplate 110. The method 700 comprises a step of generating 730 a transformed generated image plane at the second surface 113 of the fibre optical faceplate 110 whereby light from at least one fibre exit the second surface 113 as an emitted light cone. The method 700 comprises a step of changing 740 the direction of at least one emitted light cone towards an aperture by means of a surface structure arranged at the second surface 113 of the fibre optical faceplate 110.

The invention claimed is:

1. An image generator device (100) for changing the direction of at least one emitted light cone at a surface (113), the image generator device (100) comprising:
   an image generator (130); and
   a fibre optical faceplate (110) having a first (112) and a second surface (113),
   wherein:
      the second surface (113) is a curved or freeform surface, the fibre optical faceplate (110) being arranged to transmit light from the image generator (130) so at least a part of light entering the first surface (112) of the fibre optical faceplate (110) exits through the second surface (113) of the fibre optical faceplate (110) and passes through an aperture (220;520),
      the fibre optical faceplate (110) comprises a multitude of optical fibres (111) and light exiting the second surface (113) through optical fibres (111) each form an emitted light cone,
      a surface structure (120) is arranged at the second surface (113) of the fibre optical faceplate (110), the surface structure (120) being at least one of:
         a geometry engraved or etched into the second surface (113), or
         a structure separate from and positioned on top of the second surface (113), the structure being deposited by one of: photolithography, molding on top of the second surface, machining into a material separately deposited on top of the second surface, or three-dimensionally printed on top of the second surface, and the surface structure (120) comprises at least one step structure (121) that alters a surface normal of the second surface (113) to be constant across an entirety of the second surface (113), such that the surface structure (120) is arranged to, by refraction, change the direction of at least part of the emitted light cones exiting the second surface (113) of the fibre optical faceplate (110) towards the aperture (220; 520).

2. The device according to claim 1, wherein the first surface (112) of the fibre optical faceplate (110) is a non-planar surface.

3. The device according to claim 1, wherein the image generator (130) comprises a liquid crystal display or a light-emitting diode display or a digital micromirror device or a cathode-ray tube display.

4. The device according to claim 1, wherein the surface structure (120) comprises a substructure.

5. The device according to claim 1, wherein the geometry of the surface structure (120) is arranged to change the surface normal of at least part of the second surface (113) of the fibre optical faceplate (110) to change the direction of at least one emitted light cone.

6. The device according to claim 1, wherein a first surface structure (120) is applied to a first region of the second surface (113) of the fibre optical faceplate (110) and a second surface structure (120) is applied to a second region of the second surface (113) of the fibre optical faceplate (110).

7. The device according to claim 1, wherein the surface structure (120) comprises a Fresnel lens, forming a circular symmetric pattern of concentric ring structures.

8. The device according to claim 1, wherein the surface structure (120) comprises a non-circular symmetric Fresnel lens, forming a pattern of concentric elliptical structures.

9. The device according to claim 1, wherein the thickness and/or depth of the surface structure (120) is in the range of 10 nm-1000 μm.

10. The device according to claim 1, wherein the wherein the thickness and/or depth of the surface structure (120) is in the range of 1-100 μm.

11. The device according to claim 1, wherein the surface structure is at least one of:
   a geometry engraved or etched into the second surface; or
   a structure added on top of the second surface, wherein the surface structure is deposited on the fibre optical faceplate surface by means of photolithography or molded on top of the fibre optical faceplate surface or machined into a material deposited on top of the fibre optical faceplate surface or 3D-printed on top of the fibre optical faceplate surface.

12. An optical system (500) comprising:
   a combiner (510); and an image generator device (100),
wherein:
the image generator device (100) comprises an image generator (130) and a fibre optical faceplate (110) having a first (112) and a second surface (113),
the second surface (113) is a curved or freeform surface, the fibre optical faceplate (110) being arranged to transmit light from the image generator (130) so at least a part of light entering the first surface (112) of the fibre optical faceplate (110) exits through the second surface (113) of the fibre optical faceplate (110),
the fibre optical faceplate (110) comprises a multitude of optical fibres (111) and light exiting the second surface (113) through optical fibres (111) each form an emitted light cone,
a surface structure (120) is arranged at the second surface (113) of the fibre optical faceplate (110) the surface structure (120) being at least one of:
a geometry engraved or etched into the second surface (113), or
a structure separate from and positioned on top of the second surface (113), the structure being deposited by one of: photolithography, molding on top of the second surface, machining into a material separately deposited on top of the second surface, or three-dimensionally printed on top of the second surface, and the surface structure (120) comprises at least one step structure (121) that alters a surface normal of the second surface (113) to be constant across an entirety of the second surface (113), such that the surface structure (120) is arranged to, by refraction, change the direction of at least one emitted light cone of light exiting the second surface (113) towards an eye box (520) via the combiner (510).

13. The system according to claim 12, comprising a beam splitter (630) arranged to reflect light from the second surface (113) of the fibre optical faceplate (110) towards the combiner (510), and transmit the reflected light from the combiner (510) to the eye box (520).

14. The system according to claim 12, comprising at least one optical component arranged to direct light between the image generator device (100) and/or the beam splitter (630) and/or the combiner (510) and/or the eye box (520).

15. The system according to claim 12, wherein the system is a head up display system.

16. The system according to claim 12, wherein the surface structure is at least one of:
a geometry engraved or etched into the second surface; or
a structure added on top of the second surface, wherein the surface structure is deposited on the fibre optical faceplate surface by means of photolithography or molded on top of the fibre optical faceplate surface or machined into a material deposited on top of the fibre optical faceplate surface or 3D-printed on top of the fibre optical faceplate surface.

17. A method (700) for changing the direction of at least one emitted light cone, the method comprising:
transmitting (710) light from an image generator (130) to a first surface (112) of a fibre optical faceplate (110), whereby forming a generated image plane at the first surface (112) of the fibre optical faceplate (110),
transmitting (720) at least part of the light entering the first surface (112) of the fibre optical faceplate (110) to a curved or freeform second surface (113) of the fibre optical faceplate (110), whereby for each at least one fibre (111) of the fibre optical faceplate (110) an emitted light cone of light exiting the second surface (113) is formed,
generating (730) a transformed generated image plane at the second surface (113) of the fibre optical faceplate (110), and
changing (740) by refraction the direction of the at least one emitted light cone of light exiting the fibre optical faceplate (110) through the second surface (113) towards an aperture (220;520), said changing occurring via a surface structure (120) arranged at the second surface (113) of the fibre optical faceplate (110), the surface structure (120) comprising at least one step structure (121) that alters a surface normal of the second surface (113) to be constant across an entirety of the second surface (113), such that the surface structure (120) and being at least one of:
a geometry engraved or etched into the second surface (113), or
a structure separate from and added on top of the second surface (113), the structure being deposited by one of: photolithography, molding on top of the second surface, machining into a material separately deposited on top of the second surface, or three-dimensionally printed on top of the second surface.

18. The method according to claim 17, wherein the surface structure is at least one of:
a geometry engraved or etched into the second surface; or
a structure added on top of the second surface, wherein the surface structure is deposited on the fibre optical faceplate surface by means of photolithography or molded on top of the fibre optical faceplate surface or machined into a material deposited on top of the fibre optical faceplate surface or 3D-printed on top of the fibre optical faceplate surface.

* * * * *